March 23, 1954

J. MERCK 2,672,997

TIMBER SETTING MACHINE

Filed Feb. 26, 1949

Inventor:
John Merck.
by Charles F. Ozard.
Attorney.

March 23, 1954

J. MERCK 2,672,997

TIMBER SETTING MACHINE

Filed Feb. 26, 1949

Inventor:
John Merck.
by Charles F. Osgood,
Attorney.

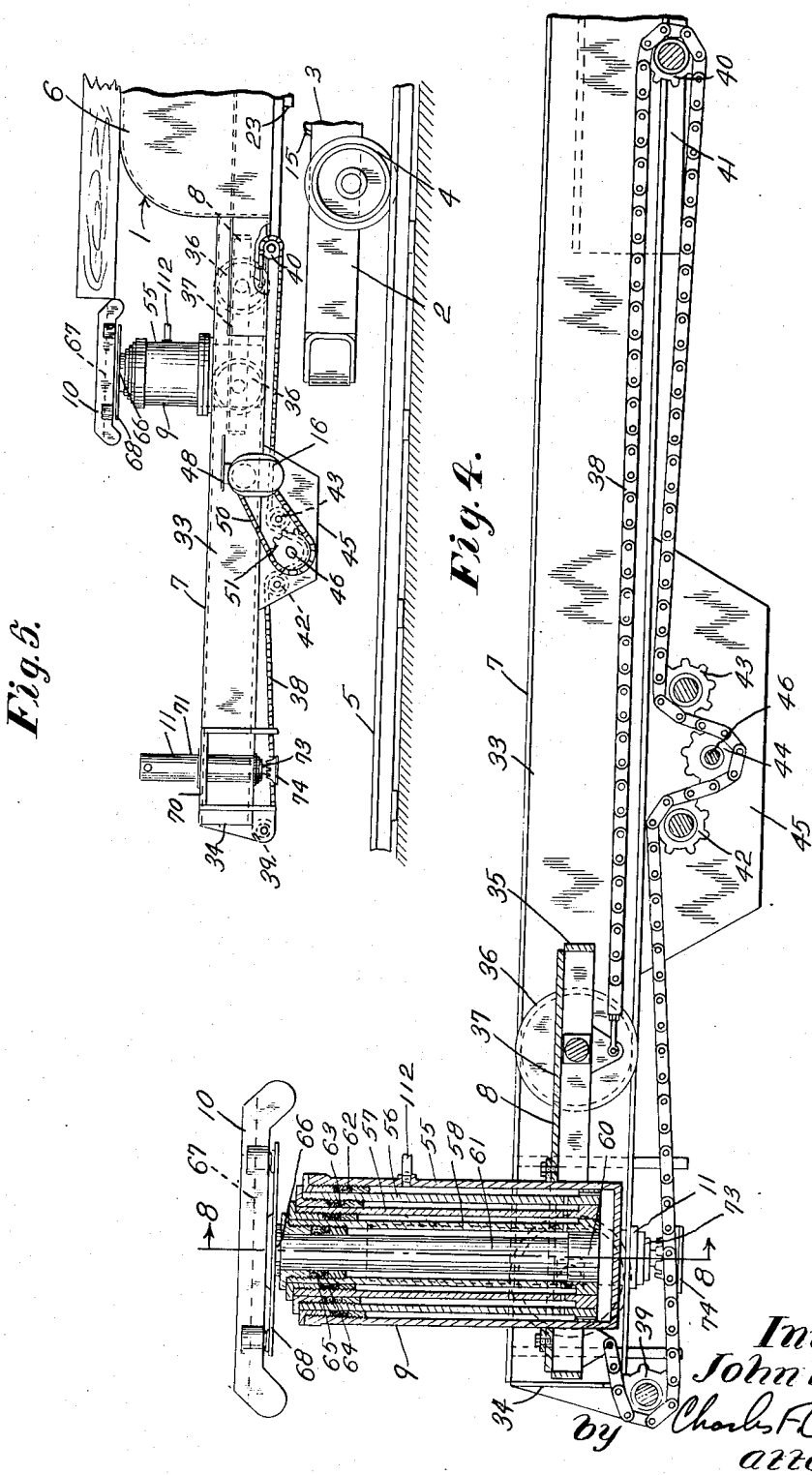

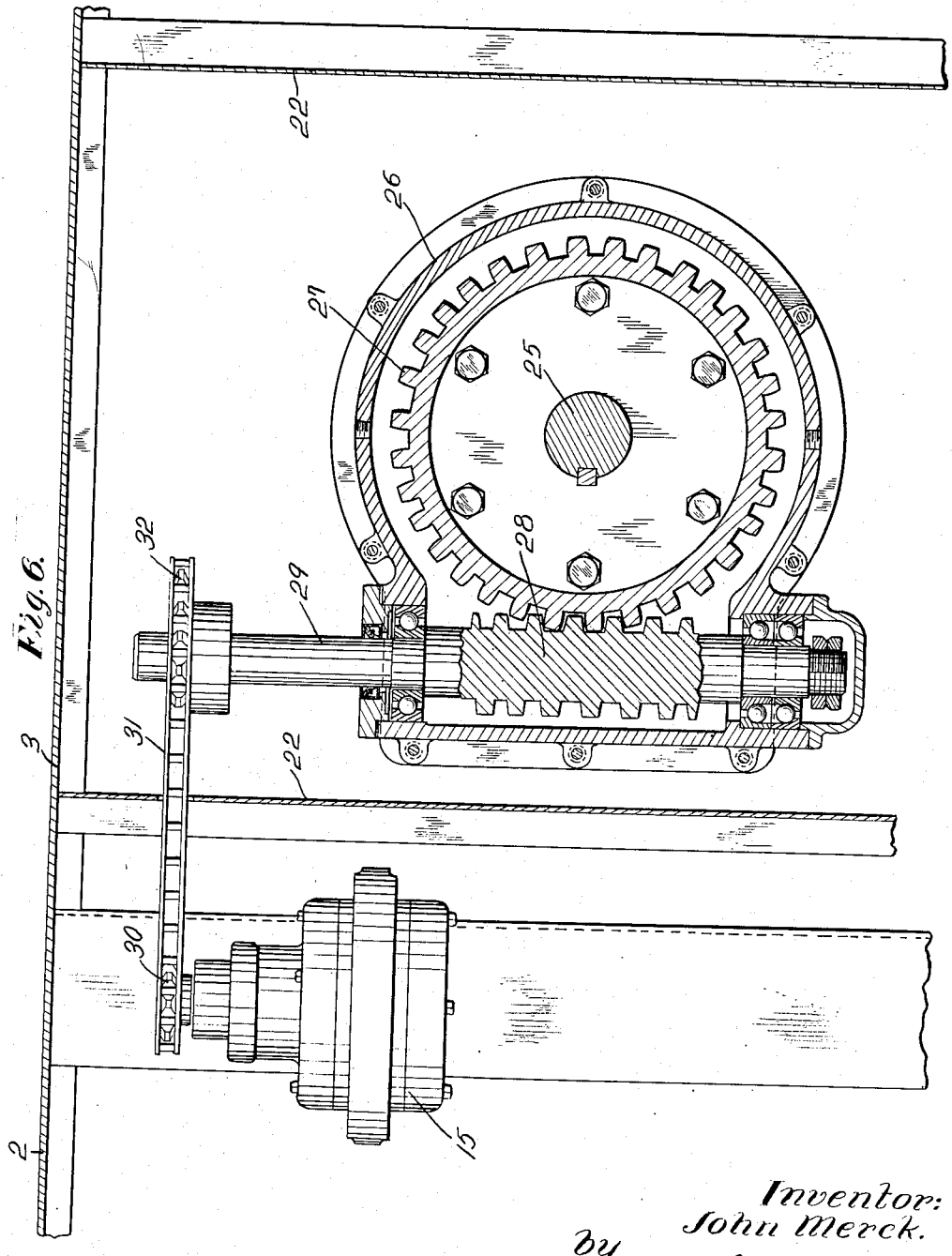

March 23, 1954  J. MERCK  2,672,997
TIMBER SETTING MACHINE
Filed Feb. 26, 1949  8 Sheets-Sheet 5
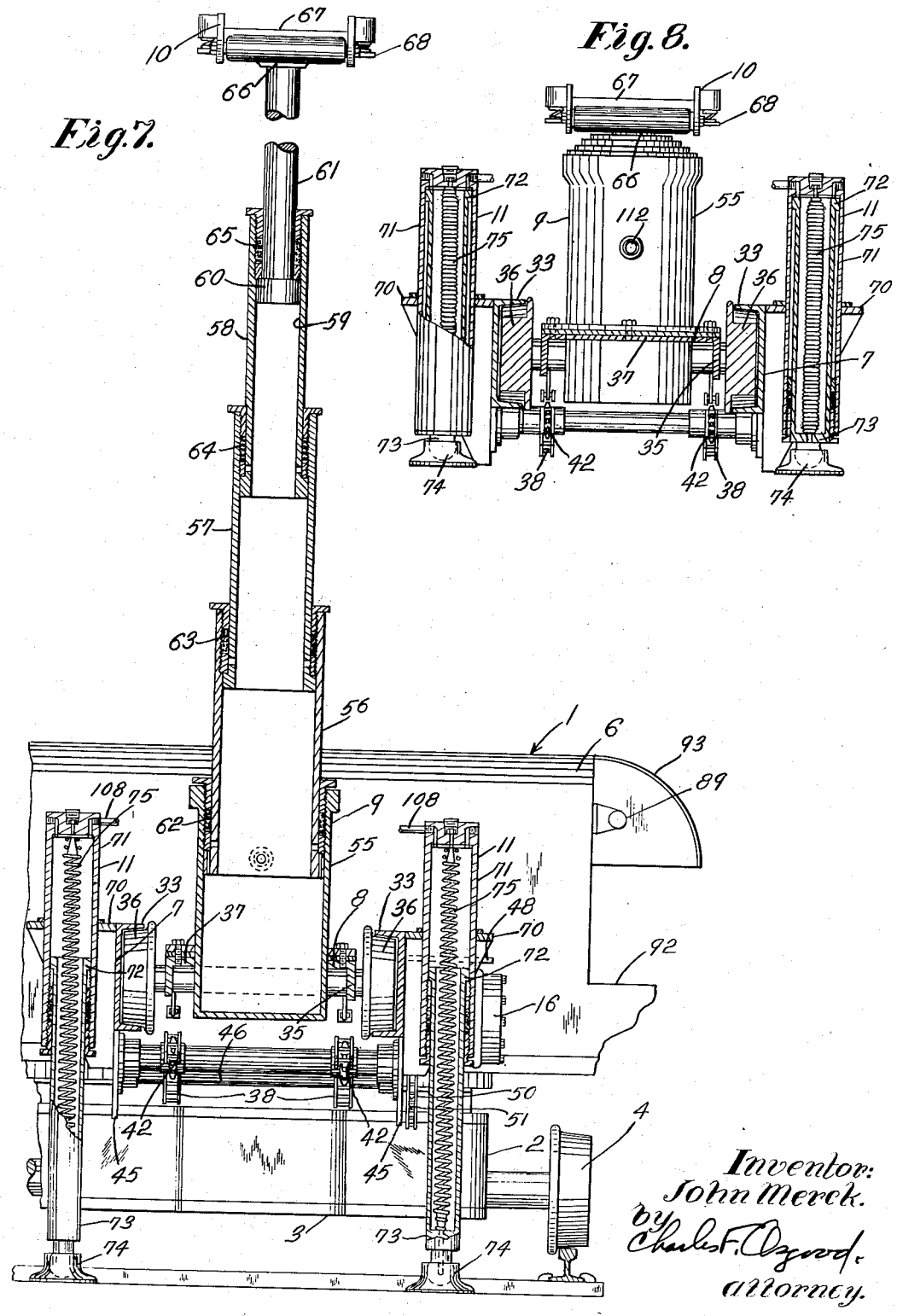
Inventor:
John Merck.
by Charles F. Osgood,
Attorney.

March 23, 1954

J. MERCK 2,672,997

TIMBER SETTING MACHINE

Filed Feb. 26, 1949

Inventor:
John Merck.
By Charles F. Osgood,
Attorney.

March 23, 1954

J. MERCK 2,672,997

TIMBER SETTING MACHINE

Filed Feb. 26, 1949

Inventor:
John Merck.
By Charles F. Osgood,
Attorney.

March 23, 1954 J. MERCK 2,672,997
TIMBER SETTING MACHINE
Filed Feb. 26, 1949 8 Sheets-Sheet 8

Inventor:
John Merck.
By Charles F. Osgood,
Attorney.

Patented Mar. 23, 1954

2,672,997

UNITED STATES PATENT OFFICE 2,672,997

TIMBER SETTING MACHINE

John Merck, Franklin, Pa., assignor to Joy Manufacturing Company, Pittsburgh, Pa., a corporation of Pennsylvania Application February 26, 1949, Serial No. 78,523

16 Claims. (Cl. 214—670)

This invention relates to timber setting machines and more particularly to a timber setting machine of the wheel mounted, track guided type having an adjustably mounted timber elevator for setting cross timbers in various positions against the roof of a mine or tunnel.

The timber setting machine of the present invention is adapted to travel about a mine or tunnel while guided by a trackway laid on the floor, and is adapted to be hauled about the mine or tunnel by a conventional locomotive which travels along the trackway. A load of cross timbers and props may be carried by a trailer truck which may be coupled to the timber setting machine and which may be self-propelled, if desired, to serve as a haulage unit for the timber setting machine in place of the locomotive. In accordance with the present invention, the trailer truck which carries the timber and prop load is desirably arranged between the locomotive and the timber setting machine. The timber setting machine may comprise a truck carried by wheels which engage the rails of the trackway, and having a body swivelled thereon, and carrying a horizontal guide frame or arm projecting a substantial distance laterally of the truck and providing guideways along which a trolley or carriage is movable. The carriage may have mounted thereon a timber elevating device or timber elevator for receiving a cross timber and for raising the same up against the roof. The machine body may carry a saw mechanism so that when a timber is unloaded from the trailer truck and placed in position on the machine body it may be sawed to proper length. The cut timber may then be placed on the top of the machine body and with the carriage and elevating device thereon in retracted position on the guide frame, the timber may be moved endwise from the machine body onto the saddle of the timber elevating device. Floor jacks at the outer end of the guide frame may then be lowered into engagement with the floor so that when the timber is forced upwardly against the roof the guide frame and elevating device are firmly supported from below. The carriage may then be moved to the desired position outwardly along the guide frame with the latter located in the desired angular position. The timber on the saddle may then be turned with the saddle relative to the elevating device into a position crosswise of the guide frame, and the elevating device may be operated to raise the saddle to bring the timber thereon up against the roof. A supply of props may be carried by the machine body or by the trailer truck and when the cross timber is held against the roof, props may be sawed to proper length and placed in upright position beneath the ends of the cross timber to secure the latter firmly in roof supporting position. The timber elevating device may then be operated to lower the saddle, the floor jacks may be raised from the floor, and the carriage and the elevating device may be moved into their initial retracted position on the guide frame. By swivelly mounting the machine body on the truck the guide frame may be turned into any desired angular position above the truck wheels substantially through 180° relative to the truck. By mounting the timber elevating device on a carriage which travels along a guide frame the timber receiving saddle may be located in any desired position along the guide frame, and by mounting the guide frame to swing horizontally, the timber elevating device may be positioned through a relatively wide range with respect to the track. As a result of this flexibility in adjustment of the timber elevating device a cross timber may be readily positioned in various locations with respect to the roof to be supported.

An object of the present invention is to provide an improved timber setting machine having a relatively wide range of adjustment thereby facilitating the proper locating of a cross timber with respect to the roof to be supported. Another object is to provide an improved timber setting machine of the wheel mounted, track guide type adapted to travel along a trackway laid on the floor of a mine or tunnel and embodying improved timber elevating means which may be adjusted in horizontal planes above the wheels through a relatively wide range. Yet another object is to provide an improved timber setting machine having a portable base and improved swivelled mounting means for the timber elevator on the base whereby the timber receiving saddle may be adjusted through a relatively wide range with respect to the base. A further object is to provide an improved timber setting machine having a wheeled truck on which the machine body is swivelled to swing in horizontal planes, with the swivelled machine body carrying a horizontal guide frame which projects outwardly from the truck above the truck wheels and provides guideways for a carriage by which a timber elevator is carried whereby a timber supported by the elevator may be readily placed against a roof at different distances and in different angular positions with respect to the truck. A still further object is to provide a horizontal guide frame mounted for horizontal adjustment relative to the machine base and providing an elongated guideway along which a timber elevating device is movable into different timber setting positions. Yet another object is to provide an improved swivelly mounted, horizontal guide frame of the above character, having adjustable floor engaging supports at its other extremity whereby the guide frame may be firmly supported in a horizontal position on the floor during the setting of a cross timber against the roof. A still further object is to provide improved motor operated means on the guide frame for adjusting the timber elevating device back and forth along the frame guideways and for holding the elevating device in adjusted position. Still another object is to provide an improved timber setting machine having a novel combination and arrangement of parts. These and other objects and advantages of the invention will, however, hereinafter more fully appear.

In the accompanying drawings there is shown for purposes of illustration one form which the invention may assume in practice.

In these drawings:

Fig. 4 is an enlarged view in longitudinal vertical section taken substantially on line 4—4 of Fig. 1, showing details of the guide frame, the carriage and the timber elevating jack.

Fig. 5 is a fragmentary side elevational view of the forward portion of the machine shown in Fig. 2, with the carriage and timber elevating jack in retracted timber receiving position on the guide frame.

Fig. 6 is an enlarged horizontal detail sectional view taken substantially on line 6—6 of Fig. 2, showing the turning mechanism for the machine body.

Fig. 7 is an enlarged cross sectional view taken substantially on line 7—7 of Fig. 1, showing the timber elevating and floor jacks in extended positions.

Fig. 8 is a cross sectional view taken substantially on line 8—8 of Fig. 4, with parts shown in full to facilitate illustration.

Figure 1:
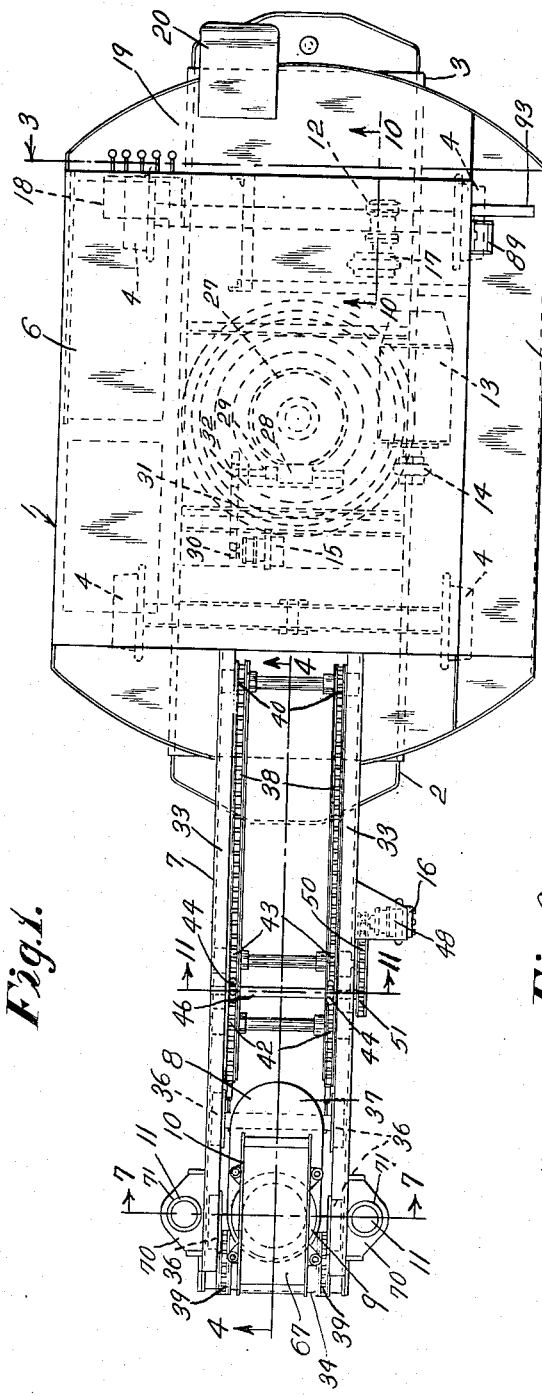
Fig. 1 is a plan view of the improved timber setting machine.

In this illustrative embodiment of the invention, as shown in the drawings, the improved timber setting machine, generally designated 1, comprises a portable base 2, herein a truck, having a frame 3 provided with usual end bumpers and coupling means and mounted on wheels 4 adapted to travel along the rails of a trackway 5 laid on the mine or tunnel floor. Evidently, the base may be mounted on rubber-tired wheels or endless crawler treads to travel over the floor without the aid of a guiding trackway, if desired.

Mounted on the truck to swing horizontally with respect thereto about an upright axis located centrally of the truck frame is a machine body 6 which has an elongated horizontal guide frame or arm 7 which projects a substantial distance outwardly from the front end of the body, and movable horizontally along the guide frame is a carriage or trolley 8 which carries a timber elevating device 9, desirably in the form of an extensible, vertical, fluid operated jack, for elevating a timber receiving saddle 10 in a vertical direction to bring a cross timber thereon up against the roof. Carried at the sides of the outer portion of the guide frame 7 are floor engaging supports 11, 11, desirably in the form of extensible fluid operated floor engaging jacks. Arranged at the rearward portion of the swivelled machine body is a saw mechanism 12. A motor 13, desirably an electric motor, is arranged within the machine body and drives a pump 14. A reversible motor 15, desirably a conventional fluid motor, on the truck serves to rotate the swivelled body, a reversible motor 16, desirably a conventional fluid motor, on the guide frame serves to move the carriage back and forth along the frame guideways; and a motor 17, desirably a conventional fluid motor 17, on the body serves to drive the saw. A control valve mechanism 18 on the rearward portion of the machine body near an operator's platform 19, is provided to control the flow of fluid under pressure from the pump to the several hydraulic motors 15, 16, and 17 and to the elevating and floor jacks 9 and 11. A seat 20 for the operator is located on the operator's platform and the control valve mechanism 18 is conveniently located near the operator's station.

Figure 2:
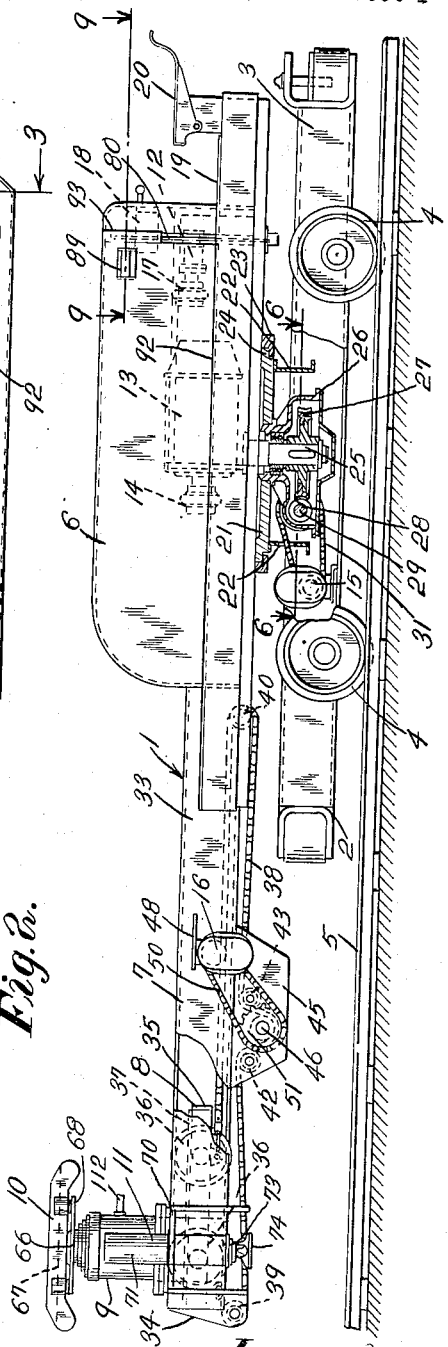
Fig. 2 is a side elevational view of the timber setting machine shown in Fig. 1, with parts shown in vertical section and partially broken away to illustrate structural details.

The body 6 of the machine is swivelly mounted on a circular turntable frame 21 arranged centrally on the truck frame and rigidly secured to transverse channel members 22 in turn rigidly secured to the truck frame, and an annular retaining ring 23 fixed to the bottom of the body has a flange which underlies the annular outer rim or flange 24 of the circular turntable frame, as shown in Fig. 2. A vertical shaft 25 suitably secured to the machine body, is journalled in bearings supported within a gear housing 26 in turn suitably secured to the truck frame, with a circular upper portion thereof which surrounds the shaft fitting within an opening in the circular turntable plate, in the manner shown. This shaft projects downwardly within the housing and has a worm wheel 27 keyed thereto. A worm 28 secured to a transverse shaft 29, meshes with the worm wheel, and this shaft is journalled in bearings supported within the housing, as shown in Fig. 6. The fluid motor 15 is mounted on a horizontal plate secured to the sides of the truck frame near the frame bottom and has fixed to its horizontal power shaft a drive sprocket 30 which is connected by an endless drive chain 31 to a chain sprocket 32 in turn fixed to the worm shaft 29. Thus when the motor 15 is running the swivelled machine body may be rotated on its swivel mounting in the desired direction relative to the truck, and when the motor is stopped the fluid trapped within the motor serves to lock the machine body in its position of swivelled adjustment. The control valve means for the motor 15 will later be described.

Figure 11:
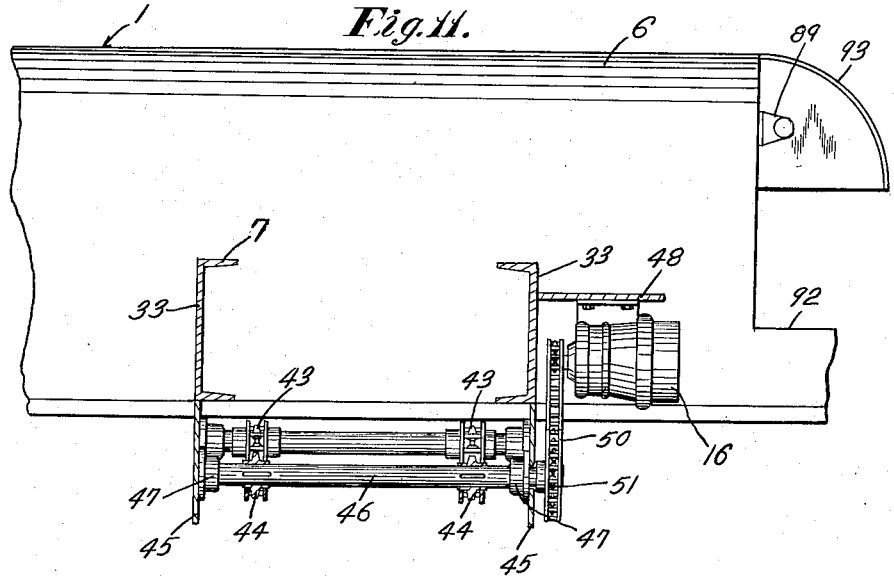
Fig. 11 is an enlarged cross sectional view taken on line 11—11 of Fig. 1, through the carriage guide frame.

Now referring to the structure of the horizontal guide frame 7 and the carriage 8 thereon, it will be noted that the guide frame comprises parallel horizontal channel members 33, 33 rigidly secured at their inner ends to the machine body and having inwardly directed upper and lower flanges which provide a trackway or guide for the carriage, and outer ends of the channel members are rigidly connected together by a cross frame 34. The carriage comprises a horizontal frame 35 carried by flanged wheels 36 which run along the top surfaces of the bottom flanges of the channel members intermediate the upper and lower flanges as shown in Figs. 7 and 8. The carriage frame has a horizontal top plate 37 on which the timber elevating jack 9 is mounted, with the jack located in the space between the channel members. A pair of parallel pivoted-link chains 38 extend along the inner sides of the channel members and are connected at their ends to depending lugs on the carriage frame, and these chains pass around end idler sprockets 39 and 40. The rear sprockets 40 are mounted on a transverse shaft supported within side plates 41 secured to the outer sides of the channel members while the front sprockets 39 are mounted on a transverse shaft supported within the outer cross frame 34. These chains pass over a pair of guide spockets 42 and 43 and downwardly around drive sprockets 44. The sprockets 42 and 43 are mounted on transverse shafts supported in depending side plates 45 secured as by welding to the bottoms of the channel members. The drive sprockets 44 are keyed to a parallel shaft 46 journalled in bearings 47 supported by the side plates 45 (Fig. 11). The motor 16 is carried by a bracket 48 secured to the adjacent side of the guide frame and has a drive sprocket (Fig. 11) fixed to its power shaft and engaging an endless drive chain 50 which in turn engages a chain sprocket 51 secured to the drive sprocket shaft 46. Thus when fluid under pressure is properly supplied to the motor 16 the carriage 8 may be moved, through the chain and sprocket connections above described, back and forth along the guideways of the guide frame 7, and when the motor is stopped the fluid trapped therein serves to lock the carriage in its adjusted position. The control valve means for the motor 16 will be later described.

The timber elevating jack 9 may assume various forms but as shown herein is similar to that disclosed in the L. G. Felderman et al. application Ser. No. 746,832, filed May 8, 1947. The elevating jack comprises a vertical cylinder 55 having an annular flange rigidly secured as by screws to the top plate 37 of the carriage, and contained in this cylinder is a series of piston and cylinder sections 56, 57, and 58 arranged in telescopic relation and each having a tubular piston rod portion. Reciprocable in the bore 59 of the inner section 58 is a piston 60 having a piston rod 61. The outer cylinder 55 and the sections 56, 57 and 58 respectively carry suitable packings 62, 63, 64, and 65 which sealingly engage the several rod peripheries to prevent leakage. The means for supplying fluid under pressure to and for exhausting fluid from these several cylinders will later be described. Secured at 66 to the upper end of the piston rod 61 is the timber receiving saddle 10. This saddle has a timber receiving platform 67 which is resiliently and tiltably mounted on a lower support 68 in a manner similar to that disclosed in a copending application to C. F. Ball Serial No. 24,534, filed May 1, 1948, now matured into Patent Number 2,574,857, granted November 13, 1951, so that the saddle platform may have limited endwise tilt relative to the jack to compensate for any unevenness of the roof against which a cross timber is to be placed. The saddle may be turned with the inner piston rod 61 about the vertical axis of the elevating jack to locate the saddle in different angular positions.

The floor engaging jacks 11 likewise may assume various forms and are herein shown similar to the floor jack of the Felderman et al. application above referred to. There are herein shown a pair of floor jacks supported by brackets 70 (Figs. 7 and 8) secured to the outer sides of the guide frame 7. Each floor jack includes a vertical fluid cylinder 71 welded to its supporting brackets and containing a reciprocable piston 72 having its tubular piston rod 73 extending downwardly through the lower cylinder head and carrying a swivelly mounted foot-piece 74. The pistons of the floor jacks may be moved downwardly, under the influence of pressure fluid in the cylinders 71, to move the foot-pieces into firm engagement with the floor, thereby to provide a stable bottom support for the timber elevating jack during the timber setting operation. Coil springs 75 arranged within the cylinders and piston rods are connected between the upper cylinder heads and the lower ends of piston rods serve to retract the pistons 72 when fluid is vented from the cylinders. Since the specific structures of the elevating and floor jacks are fully described in the Felderman et al. application above referred to and do not per se enter into the present invention further description thereof is herein unnecessary. Pressure fluid may be admitted to the jacks, under the control of valve means to be later described, to elevate the timber receiving saddle 10 and to bring the foot-pieces of the floor jacks down against the floor.

Figure 3:
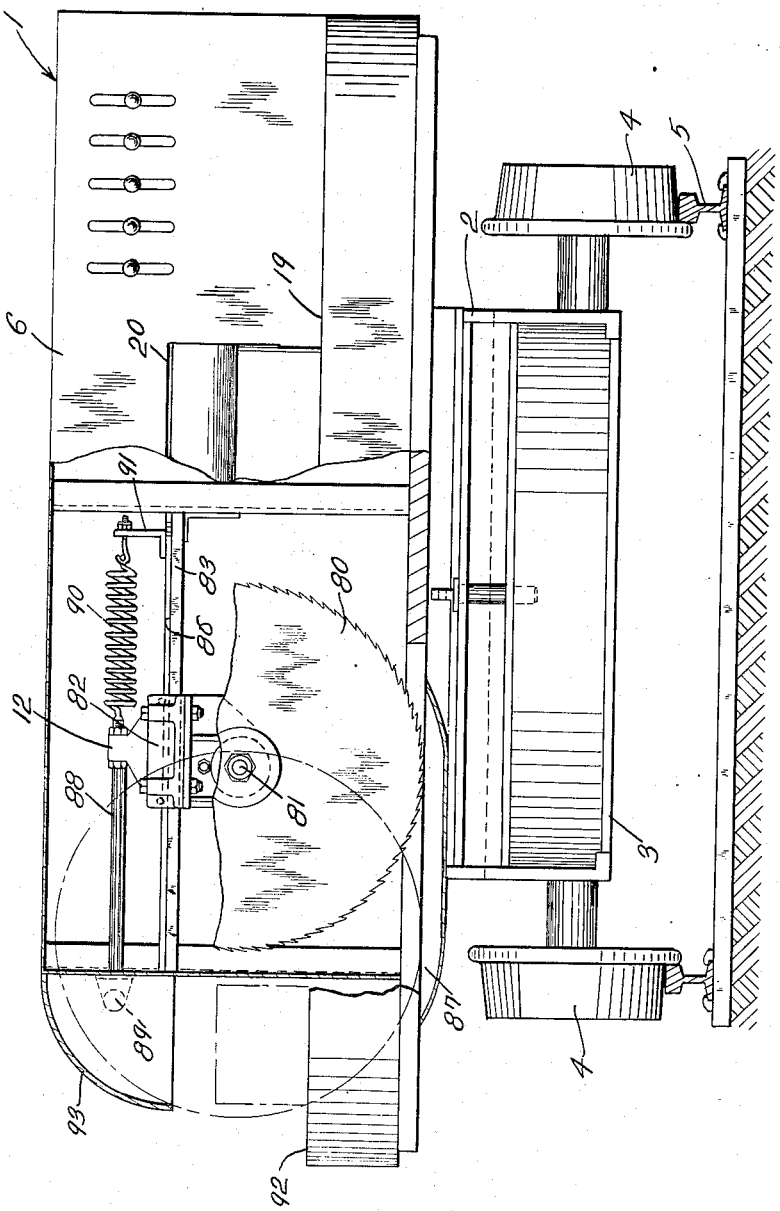
Fig. 3 is an enlarged cross sectional view taken substantially on line 3—3 of Fig. 1, with parts shown in end elevation.
Figure 9:
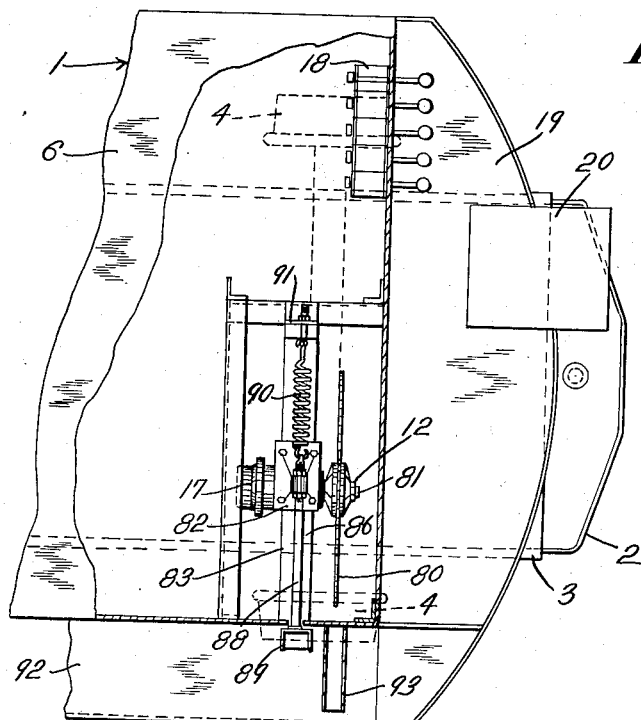
Fig. 9 is an enlarged horizontal sectional view taken substantially on line 9—9 of Fig. 2, with parts broken away to show structural details.
Figure 10:
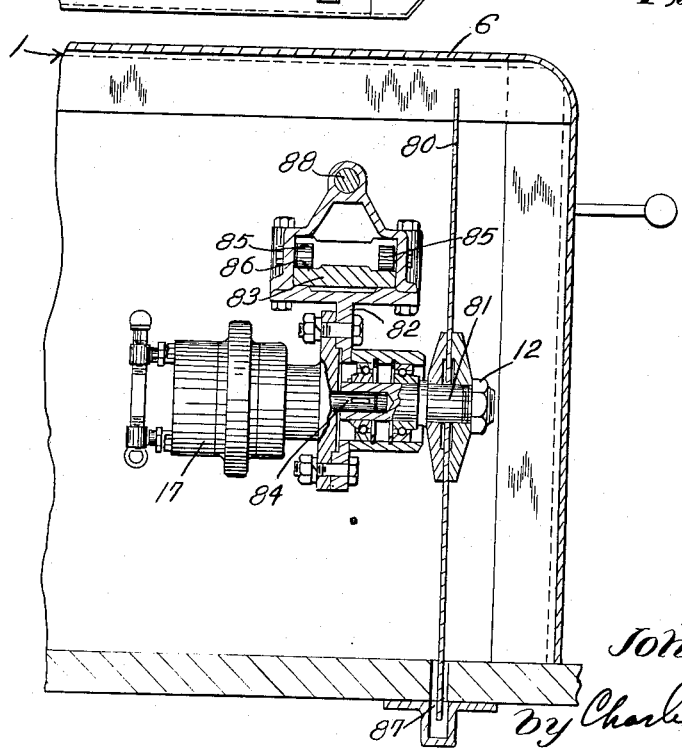
Fig. 10 is an enlarged vertical sectional view taken on line 10—10 of Fig. 1, illustrating details of the saw mechanism.

The saw mechanism 12 may likewise assume various forms but as herein shown may be similar to that disclosed in a copending application to C. F. Ball et al., Serial No. 746,646, filed May 8, 1947. This saw mechanism is arranged within the swivelled machine body 6 and comprises a circular saw blade 80 secured to a horizontal shaft 81 suitably journalled in bearings supported within a sliding support 82 mounted on a horizontal guide 83 (Figs. 3, 9, and 10). Secured to the sliding support is the fluid motor 17 which has its horizontal power shaft 84 coupled to the shaft 81. The sliding support is guided on its guide for horizontal rectilinear movement and carries bearing rollers 85 adapted to run along the upper side surfaces 86 of the guide. The saw blade is, in this instance, arranged in vertical planes extending transversely of the machine body and the outer side of the body is vertically slotted at 87 so that the saw blade may be projected outwardly from the side of the body into sawing position. A horizontal rod 88 is secured to the sliding support 82 and passes outwardly through an opening in the side of the body and has a handle 89 fixed thereto externally of the body. A spring 90 connected between the inner end of the rod 88 and a bracket 91 at the rear end of the guide, constantly urges the sliding support 82 toward its innermost position so that when the handle 89 is released by the operator the saw blade retracts automatically with the machine body. The machine body has a lateral shelf or ledge 92 extending longitudinally along the side thereof and a timber is adapted to rest on this shelf and to be moved endwise therealong into proper sawing relation with respect to the saw mechanism. A segmental guard 93 secured to the side of the body serves to house the upper portion of the saw blade when the latter is projected outwardly in its sawing position, thereby to protect the hand of the operator which grasps the saw moving handle 89. A timber or prop may be placed along the side of the body on the shelf 92 as shown in Fig. 3 and when the timber or prop is properly positioned with respect to the path of movement of the saw blade, the saw mechanism may be operated to cut the timber or prop to the desired length.

Figure 12:
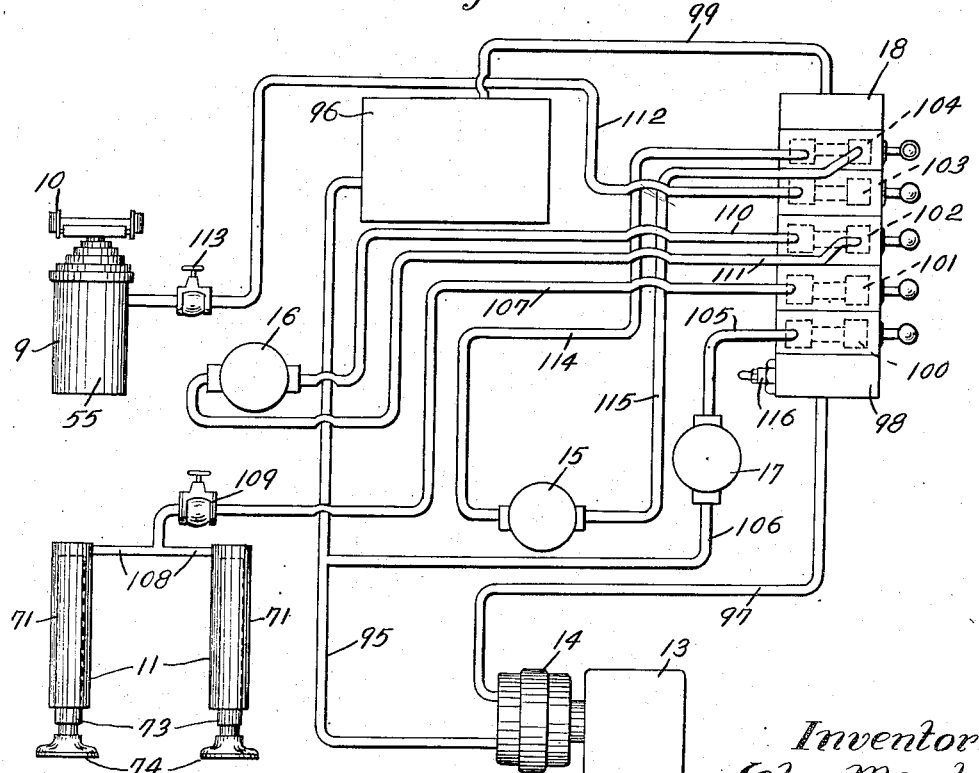
Fig. 12 is a diagrammatic view illustrating the fluid system and associated control valve means.

Now referring to the fluid system shown diagrammatically in Fig. 12, it will be observed that the motor driven pump 14 has its suction side connected by a conduit 95 to a tank 96 arranged within the machine body and containing a suitable fluid preferably a liquid such as oil. The discharge side of the pump is connected by the conduit 97 to the pressure passage of a valve box 98 of the control valve mechanism 18. The discharge passage of the valve box is connected by a return conduit 99 back to the tank 96. The valve box has a series of parallel bores which respectively receive conventional slide valves 100, 101, 102, 103, and 104 desirably of the balanced spool type each of which has an operating handle. The bore receiving the slide valve 100 is connected by a conduit 105 to the inlet side of the saw driving motor 17 and the discharge side of this motor is connected by a conduit 106 to the discharge conduit 95 leading back to the tank. The bore containing the slide valve 101 is connected by a conduit 107 and branch conduits 108 to the upper ends of the cylinders 71 of the floor jacks 11. The conduit 107 has arranged therein a hand valve 109 which is normally open and which may be closed when the floor jacks are extended into engagement with the floor to trap the fluid therein thereby to lock the same in adjusted position. The bore containing the slide valve 102 is connected by conduits 110 and 111 to the opposite sides of the motor 16 for moving the carriage back and forth along the guide frame. The bore containing the slide valve 103 is connected by a conduit 112 to the outer bottom cylinder 55 of the timber elevating jack 9, and arranged in this conduit is a hand valve 113 which is normally open and which may be closed when the elevating jack is extended to trap fluid therein thereby to lock the same in adjusted position. The bore containing the slide valve 104 is connected by conduits 114 and 115 to the opposite sides of the motor 15 which turns the machine body. The valve box has embodied therein a conventional pressure relief valve device 116 which automatically relieves the pressure in the fluid system in the event of overload. By arranging the slide valve 100 for controlling the saw driving motor 17 the first in the valve bank, the other hydraulically operated devices cannot be operated during running of the saw thereby reducing the possibility of injury to the operator.

Figure 13:
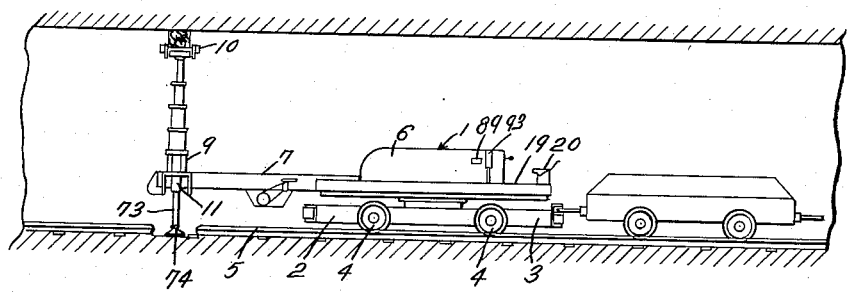
Figs. 13, 14 and 15 are diagrammatic views showing different operating positions of the timber setting machine in a mine or tunnel.
Figure 14:
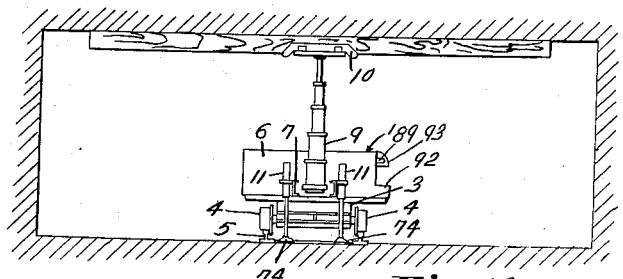
Figure 15:
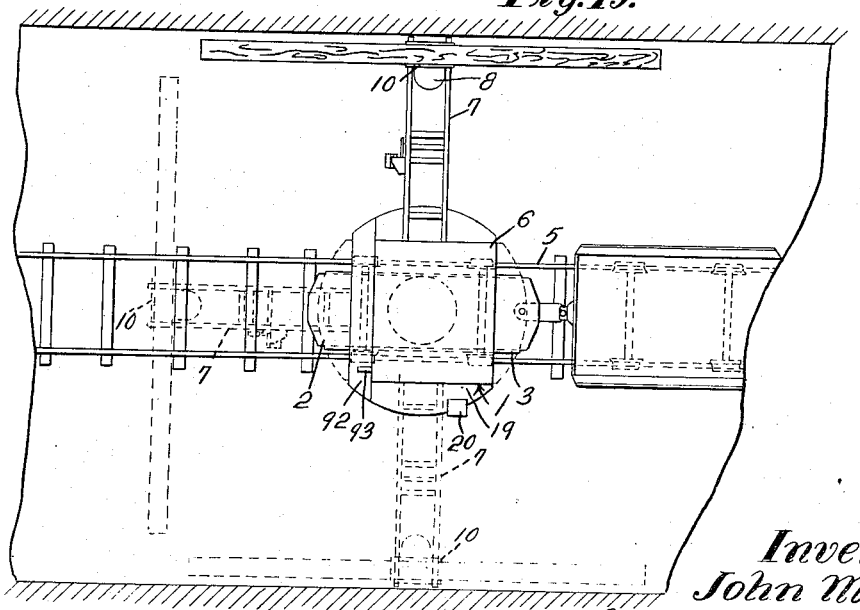

The general mode of operation of the improved timber setting machine is as follows: The timber setting machine is adapted to travel along the trackway during tramming about the mine or tunnel and a timber trailer truck is coupled to the rear end of the machine and a locomotive is coupled to the rear end of the trailer truck. Evidently, if desired the timber setting machine may have its own traction means or the machine may be trammed about the mine or tunnel by an auxiliary self-propelled truck which may carry the timber load in back of the machine. When it is desired to set a cross timber against the roof of the mine or tunnel a timber may be unloaded from the trailer truck and placed alongside the machine body on the shelf 92 and moved endwise therealong into proper sawing relation with the saw so that it may be cut off by the saw to the desired length. The saw is driven by the motor 17 under the control of the slide valve 100 at this time. The properly cut timber is then removed from the shelf and placed on the top of the machine body and moved endwise, in the manner shown in Fig. 5, onto the saddle 10 of the timber elevating jack. The motor 15 may then be operated, under the control of the slide valve 104, to turn the machine body horizontally relative to the truck to locate the guide frame 7 in the desired angular position with respect to the truck. When the guide frame is properly positioned, the slide valve 101 may be operated to effect lowering of the floor jacks 11 into engagement with the floor and by closing the hand valve 109 the floor jacks may be locked in adjusted position. The motor 16 may then be operated, under the control of the slide valve 102, to move the carriage 8 and timber elevating jack carried thereby outwardly along the guide frame to the desired position, and when the elevating jack is properly positioned the timber on the saddle 10 may be turned with the saddle into a crosswise position as shown in Fig. 15. The slide valve 103 may then be operated to supply fluid under pressure to the elevating jack 9 to raise the saddle 10 to bring the timber thereon up against the roof, as shown in Figs. 13 and 14. The props, which may be carried on the top of the machine body, may then be sawed to proper length by the saw mechanism 12, and placed in upright position, beneath the ends of the cross timber to secure the latter firmly in place against the roof. The elevating jack may then be lowered by opening the valve 113 and positioning the slide valve 103 so that fluid may be vented from the jack cylinders and the carriage may be retracted along the guide frame by the motor 16 under the control of the slide valve 102 along the guide frame to move the elevating jack back to its timber receiving position. The valve 109 may then be opened and the slide valve 101 positioned to vent the cylinders 71 of the floor jacks so that the springs 75 may retract the jack pistons to raise the jack feet 74 from the floor. In Fig. 15 the swivelled machine body, as shown in full lines, has been turned relative to the truck to locate the guide frame 7 in a right angle position at one side of the trackway so that a cross timber may be set against the roof preparatory to the making of a cross cut or room neck extending laterally from the main entry. The opposite right angle position of the guide frame and elevating jack are shown in dotted lines in Fig. 15, and the guide frame and elevating jack may be turned through 180° into any desired angular position intermediate the right angle positions shown.

As a result of this invention an improved timber setting machine of the wheel mounted, track guided type is provided having an improved adjustable mounting for the timber elevator, whereby timbers may be set through a relatively wide range of positions against the roof of a mine or tunnel. By mounting the timber elevator on a carriage which is guided for horizontal movement back and forth along a horizontal guide, and by mounting the guide frame for horizontal swinging movement relative to the truck above the wheels thereof, a timber may be placed against the roof in any desired position with the limits of adjustment of the timber elevator, thereby greatly facilitating the timbering of a roof. It will also be evident that by the provision of the various power adjustments for the timber elevator, a timber may be quickly and expeditiously placed in the desired position against the roof to be supported. Also the guide frame may be firmly supported with respect to the floor during elevation of a timber by the provision of its novel mounting of the machine body and the floor engaging jacks. By grouping the controls near the operator's station on the machine the various adjustments of the timber elevating saddle may be quickly and easily effected. The novel arrangement of the saw mechanism not only facilitates cutting of the cross timbers or props to the desired length but also safeguards the operator against injury. The machine is relatively simple in design, considering its several power adjustments and operating movements, and is also rugged in construction well adapted to meet the severe demands of service in a mine or tunnel. Other advantages of the invention will be clearly apparent to those skilled in the art.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. In a timber setting machine, the combination comprising a portable base, a horizontal guide frame swivelly mounted at its inner end on said base to swing horizontally with respect thereto, the outer portion of said frame projecting outwardly beyond said base, a timber receiving saddle, a vertical, extensible elevating jack at the top of which said saddle is carried, said elevating jack extending upwardly a substantial distance above said guide frame, means for mounting said jack on said guide frame for horizontal adjustment back and forth relative to said base irrespective of the swivelled position of said guide frame, and means swingable horizontally with said guide frame and providing a timber supporting surface, said saddle when said jack is disposed back on said guideway adapted to receive a timber moved endwise from said supporting surface, and said jack when in its forward position on said guideway operable to elevate said saddle in a vertical direction to bring the timber thereon up against a roof to be supported.

2. In a timber setting machine, a support providing a timber supporting surface and carrying a horizontal guide frame which overlies said support, means for swivelly mounting said guide frame on said support centrally between the sides of the latter to swing horizontally with respect thereto with its outer end moving through a wide arc, said guide frame projecting from said support beyond the lateral limits thereof, a carriage guided on said guide frame for horizontal adjustment back and forth therealong between a position overlying said support to a position a substantial distance beyond the lateral limits of said support, a timber elevator carried by and extending a substantial distance upwardly above said carriage, a timber receiving saddle carried by said elevator and adjustable in a vertical direction by the latter for elevating a timber carried by said saddle up against a roof to be supported, said saddle when in lowered position and said elevator is in retracted position on said guide frame adapted to receive a timber moved endwise from said supporting surface, a motor mounted on said guide frame, and connections guided on said guide frame and actuated by said motor, said connections being operatively connected to said carriage for adjusting the latter back and forth along said guide frame.

3. In a timber setting machine, a portable base, a body swivelled on said base and adapted to carry a mine timber on the top thereof, a power operated timber elevator adapted to receive a timber moved endwise from the top of said body and for raising a timber supported at the top thereof up against a roof to be supported, means for mounting said timber elevator on the forward end of said body for adjusting movement in a horizontal direction relative thereto, power operated devices on said mounting means for effecting such adjustment of said timber elevator, means providing an operator's station on the rear end of said swivelled body between the lateral limits of the latter, and control means on said swivelled body at the operator's station for controlling the operation of said timber elevator and said elevator adjusting means.

4. In a timber setting machine, a portable base, a body swivelled on said base and adapted to carry a mine timber on the top thereof, a power operated timber elevator adapted to receive a timber moved endwise from the top of said body and for raising a timber supported at the top thereof up against a roof to be supported, means for mounting said timber elevator on the forward end of said body for adjusting movement in a horizontal direction relative thereto, power operated devices on said mounting means for effecting such adjustment of said timber elevator, power operated means on said body for turning the latter on its swivel mounting on said base, means providing an operator's station on the rear end of said swivelled body between the lateral limits of the latter, and control means on said swivelled body at the operator's station for controlling the operation of said timber elevator, of said elevator adjusting means, and of said body turning means.

5. In a timber setting machine, a portable base, a body swivelled on said base and adapted to support a mine timber at the top thereof, a power operated timber elevator for receiving a timber moved endwise from the top of said body and for raising a timber up against a roof to be supported, means for mounting said timber elevator on the front end of said body for adjusting movement in a horizontal direction relative thereto, power operated devices on said mounting means for effecting such adjustment of said timber elevator, power operated means on said body for turning said body on its swivel mounting on said base, power operated floor engaging devices for supporting said elevator mounting means on the floor to provide a bottom support for said timber elevator during the elevation of a timber against the roof, means providing an operator's station on the rear end of said swivelled body within the lateral limits of the latter and located above said base, and control means on said swivelled body at the operator's station for controlling the operation of said timber elevator, of said elevator adjusting means, of said body turning means, and of said floor engaging devices.

6. In a timber setting machine, a portable base, a body swivelled on said base to turn horizontally with respect thereto about an upright axis, said body carrying a horizontal frame which projects laterally from said base in all positions of said body about its swivel, a fluid operated timber elevator carried by said horizontally projecting frame at the outer end thereof for elevating a timber up against a roof to be supported, fluid operated means on said body for turning said body on its swivel to move the outer end of said frame through a wide arc thereby to move said elevator arcuately relative to said base to vary the operating position thereof, a source of fluid under pressure carried by said body, means providing an operator's station at the rear end and between the lateral limits of said body, said operator's station located above said base, and control valve means on said body near said operator's station for controlling the flow of fluid under pressure from said source to said timber elevator and said body turning means.

7. In a timber setting machine, a portable base, a body swivelled on said base to turn horizontally with respect thereto about an upright axis, a horizontal guide projecting forwardly from the front end of said body, a fluid operated timber elevator mounted on said guide for movement back and forth therealong and adapted to raise a timber thereon up against a roof to be supported, fluid operated means for moving said elevator along said guide, fluid operated means for turning said body on its swivel, a source of fluid under pressure, means providing an operator's station at the rear end of said body, and control valve means on said body near the operator's station for controlling the flow of fluid under pressure from said source to said timber elevator, to said elevator moving means and to said body turning means.

8. In a timber setting machine, a portable base, a horizontal guide frame carried by said base and projecting outwardly therefrom near the lower portion of said body, a pair of floor engaging jacks carried at the opposite sides of the outer end of said guide frame and engageable with the floor to support said frame, a carriage guided for movement along said guide frame and positionable at the outer portion of said frame intermediate said jacks, and a timber elevator carried by and extending upwardly above said carriage for elevating a timber carried thereby at its top up against a roof to be supported, said elevator when in its outer position along said guide frame being located intermediate said floor engaging jacks and said jacks providing a stable bottom support for said elevator during the raising of a timber against the roof.

9. In a timber setting machine, a portable base, a horizontal guide frame on said base, a carriage guided for movement back and forth along said guide frame, an extensible timber elevating jack mounted on and extending a substantial distance upwardly above said carriage for elevating a timber supported at the top of said jack up against a roof to be supported, a carriage-moving-motor on said frame at one side thereof out of the path of movement of said carriage, and operative connections between said motor and said carriage including a flexible chain connected to said carriage, guide sprockets on said frame at its opposite ends for guiding said chain, a drive sprocket engaging said chain intermediate said guide sprockets, and means for securing the top run of said chain to said carriage intermediate said guide sprockets.

10. A timber setting machine comprising, in combination, a mobile base having mobile supporting means adapted to travel over the floor of a mine, a horizontal frame overlying and pivotally mounted at its inner end on said base to swing horizontally with respect to said base, said frame projecting outwardly beyond the lateral limits of said base and extending horizontally above said mobile supporting means, said frame providing a horizontal guideway extending radially of the swivel axis, power operated means for swinging said frame relative to said base, power operated supporting means carried at the outer overhanging end of said frame for supporting the latter on the mine floor in any adjusted position of the frame about its swivel, a power operated elevator jack mounted on said guide frame for movement back and forth along the frame guideway and by which a timber receiving saddle is carried, said jack extending upwardly a substantial distance above said guide frame and adjustable to elevate said saddle to bring a timber thereon up against the mine roof, and control means on said swingable frame for controlling said swinging means, said supporting means and said elevator jack.

11. In a timber setting machine, a wheeled truck, a body overlying and swivelled on said truck to swing horizontally relative thereto above the truck wheels and having a timber supporting surface, a horizontal guide carried by said body and projecting a substantial distance outwardly from the lower portion of said body, said guide swingable horizontally with said body above said wheels relative to said truck with the outer end of said frame moving through a wide arc, a carriage movable back and forth along said guide and located a substantial distance below the top of said body, said carriage movable between a position at the inner end of said guide in adjacency to said body and a position at the outer end of said guide remote from said body, an extensible timber elevating jack mounted vertically on and extending a substantial distance above said carriage, and a timber receiving saddle carried at the top of said jack, and disposable, when said carriage is located inwardly on said guide and said jack is lowered, at the level of said supporting surface in a position to receive a timber moved from said supporting surface and movable with the timber outwardly along said guide to a position at the outer end of said guide, and said jack being adjustable, when said carriage is located outwardly on said guide, to raise said saddle for elevating the timber supported thereby in a vertical direction to bring the timber up against a roof to be supported.

12. In a timber setting machine, a wheeled truck, a body overlying said truck and swivelled thereon to swing relative thereto in horizontal planes above the tops of the truck wheels, a horizontal guide frame carried by said body and projecting outwardly from the lower portion of said body a substantial distance from said truck, said frame swingable horizontally with said body relative to said truck with the outer end of said frame moving through a wide arc, said body being turnable relative to said truck to locate said guide frame in a right angle position at either side of the path of movement of said truck or in any desired intermediate position, a carriage guided on said guide frame below the top of said body for movement back and forth therealong between a position at one end of said guide frame and a position at the opposite end of said guide frame, and a timber elevator having a timber receiving saddle at its top, said elevator extending upwardly above said carriage with said saddle located near the top of said body, said carriage movable outwardly on said guide frame to move the timber on said saddle to the outer end of said guide frame, said elevator when said carriage is so positioned operable to move a timber supported on said saddle up against a roof to be supported.

13. In a timber setting machine, a portable base, a body swivelled on said base to turn horizontally with respect thereto about an upright axis, a horizontal guide projecting forwardly from the front end of said body, a fluid operated floor engaging jack for supporting the outer overhanging end of said guide, a fluid operated timber elevator mounted on said guide for movement back and forth therealong and adapted to raise a timber thereon up against a roof to be supported, fluid operated means for moving said elevator along said guide, fluid operated means for turning said body on its swivel, a source of fluid under pressure, means providing an operator's station at the rear end of said body, and control valve means on said body near the operator's station for controlling the flow of fluid under pressure from said source to said floor jack, to said timber elevator, to said elevator moving means and to said body turning means.

14. In a timber setting machine, a portable wheel supported base, a support swivelly mounted on said base to swing horizontally with respect thereto and having an upper horizontal timber-receiving surface, a horizontal guide frame carried by said support near the bottom thereof a substantial distance below the top surface of said support and extending in a radial direction with respect to the swivel axis of said support, said guide frame overlying and projecting outwardly beyond said base and adapted to swing horizontally above the wheels of said base, a timber-receiving saddle disposed at one end of said support for receiving a timber supported by the upper surface of said support, a vertical, extensible elevating jack for said saddle and extending upwardly above said guide frame, and means for mounting said jack on said guide frame for horizontal adjusting movement back and forth along said guide frame, said jack operable to elevate said saddle a substantial distance above the top of said support to bring a timber on said saddle up against a roof to be supported.

15. In a timber setting machine, a portable wheel supported base, a support swivelly mounted on said base to swing horizontally with respect thereto and having an upper horizontal timber-receiving surface, a horizontal guide frame carried by said support near the bottom thereof a substantial distance below the top surface of said support and extending in a radial direction with respect to the swivel axis of said support, said guide frame overlying and projecting outwardly beyond said base and adapted to swing horizontally above the wheels of said base, a timber-receiving saddle disposed at one end of said support for receiving a timber supported by the upper surface of said support, a vertical, extensible elevating jack for said saddle and extending upwardly above said guide frame, means for mounting said jack on said guide frame for horizontal adjusting movement back and forth along said guide frame, said jack operable to elevate said saddle a substantial distance above the top of said support to bring a timber on said saddle up against a roof to be supported, motor operated mechanism on said base and connected to said support for swinging the latter horizontally about its swivel axis relative to said base, motor operated mechanism on said guide frame and connected to said jack moving means for moving the latter horizontally back and forth along said guide frame, a source of power on said swivelled support, and control means located at the opposite end of said support for controlling the flow of power medium to said motor operated mechanisms.

16. In a timber setting machine, a portable wheel supported base, a support swivelly mounted on said base to swing horizontally with respect thereto and having an upper horizontal timber-receiving surface, a horizontal guide frame carried by said support near the bottom thereof a substantial distance below the top surface of said support and extending in a radial direction with respect to the swivel axis of said support, said guide frame overlying and projecting outwardly beyond said base and adapted to swing horizontally above the wheels of said base, a timber-receiving saddle disposed at one end of said support for receiving a timber supported by the top surface of said support, a vertical, extensible elevating jack for said saddle and extending upwardly above said guide frame, means for mounting said jack on said guide frame for horizontal adjusting movement back and forth along said guide frame, said jack operable to elevate said saddle a substantial distance above the upper of said support to bring a timber on said saddle up against a roof to be supported, fluid operated mechanism on said base and connected to said support for swinging the latter horizontally about its swivel axis relative to said base, fluid operated mechanism on said guide frame and connected to said jack mounting means for moving the latter horizontally back and forth along said guide frame, a fluid pump on said swivelled support, and control valve means located at the opposite end of said support for controlling the flow of fluid under pressure to said fluid operated mechanisms.

JOHN MERCK.

References Cited in the file of this patent

UNITED STATES PATENTS

| Number | Name | Date |
| --- | --- | --- |
| 520,488 | Morgan et al. | May 29, 1894 |
| 590,990 | Kilgore | Oct. 5, 1897 |
| 1,049,229 | Harris | Dec. 31, 1912 |
| 1,908,793 | Saeder | May 16, 1933 |
| 2,071,503 | Dalton | Feb. 23, 1937 |
| 2,408,387 | Gay et al. | Oct. 1, 1946 |
| 2,456,878 | Krupka et al. | Dec. 21, 1948 |
| 2,467,113 | Dieters | Apr. 12, 1949 |
| 2,597,086 | Morrow | May 20, 1952 |

FOREIGN PATENTS

| Number | Country | Date |
| --- | --- | --- |
| 609,498 | France | May 15, 1926 |
| 664,920 | Germany | Sept. 13, 1938 |
| 615,281 | Great Britain | Jan. 4, 1949 |